(12) United States Patent
Shen et al.

(10) Patent No.: US 11,409,794 B2
(45) Date of Patent: Aug. 9, 2022

(54) IMAGE DEFORMATION CONTROL METHOD AND DEVICE AND HARDWARE DEVICE

(71) Applicant: BEIJING BYTEDANCE NETWORK TECHNOLOGY CO., LTD., Beijing (CN)

(72) Inventors: Yanhao Shen, Beijing (CN); Xu Fan, Beijing (CN); Guangyao Ni, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/384,189

(22) Filed: Jul. 23, 2021

(65) Prior Publication Data

US 2021/0406305 A1    Dec. 30, 2021

Related U.S. Application Data

(63) Continuation of application No. PCT/CN2020/070729, filed on Jan. 7, 2020.

(30) Foreign Application Priority Data

Jan. 25, 2019  (CN) .................. 201910073610.7

(51) Int. Cl.
G06F 16/783    (2019.01)
G06F 16/78     (2019.01)
G06F 16/68     (2019.01)

(52) U.S. Cl.
CPC ........ *G06F 16/7834* (2019.01); *G06F 16/686* (2019.01); *G06F 16/7837* (2019.01); *G06F 16/7867* (2019.01)

(58) Field of Classification Search
None
See application file for complete search history.

(56) References Cited

U.S. PATENT DOCUMENTS 6,462,741 B1 * 10/2002 Nishihata ............ G06T 13/205
                                                  345/473
6,898,759 B1 *  5/2005 Terada ................. G10H 1/0066
                                                  345/473

(Continued)

FOREIGN PATENT DOCUMENTS

CN    1466104 A    1/2004
CN    1731833 A    2/2006
(Continued)

OTHER PUBLICATIONS

International Patent Application No. PCT/CN2020/070729; Int'l Search Report; dated Mar. 31, 2020; 3 pages.

*Primary Examiner* — Gelek W Topgyal
(74) *Attorney, Agent, or Firm* — BakerHostetler

(57) ABSTRACT

A method and a device for controlling deformation on an image, and a hardware device are provided. In the method for controlling deformation on an image, a to-be-processed image is acquired; an audio file is acquired; the audio file is played and a first attribute value of the audio file corresponding to a current time point is acquired; an extent of the deformation on the image is determined based on the first attribute value; and deformation processing is performed on the to-be-processed image based on the extent of the deformation on the image. With the method for controlling deformation on an image, the extent of the deformation on the image is controlled based on the attribute value of the audio file, thereby solving the technical problem in the conventional technology that the special effects of deformation cannot be flexibly generated.

17 Claims, 5 Drawing Sheets

(56) References Cited

U.S. PATENT DOCUMENTS

| | | | |
|---|---|---|---|
| 2009/0268039 A1 | 10/2009 | Yi | |
| 2010/0118033 A1* | 5/2010 | Faria | G10H 1/368 |
| | | | 345/473 |
| 2011/0206354 A1* | 8/2011 | Omura | G06K 9/469 |
| | | | 386/343 |
| 2012/0179757 A1* | 7/2012 | Jones | G06Q 50/01 |
| | | | 709/204 |
| 2012/0237186 A1* | 9/2012 | Makino | H04N 5/76 |
| | | | 386/282 |
| 2018/0197578 A1* | 7/2018 | Ridder | G11B 27/031 |

FOREIGN PATENT DOCUMENTS

| | | |
|---|---|---|
| CN | 108322802 A | 7/2018 |
| CN | 108334821 A | 7/2018 |
| CN | 108769535 A | 11/2018 |
| CN | 108989706 A | 12/2018 |
| CN | 109147825 A | 1/2019 |
| CN | 110072047 A | 7/2019 |
| TW | 201618531 A | 5/2016 |

\* cited by examiner

IMAGE DEFORMATION CONTROL METHOD AND DEVICE AND HARDWARE DEVICE

CROSS REFERENCE OF RELATED APPLICATION

The present application is a continuation of International Patent Application No. PCT/CN2020/070729, titled "IMAGE DEFORMATION CONTROL METHOD AND DEVICE AND HARDWARE DEVICE", filed on Jan. 7, 2020, which claims priority to Chinese Patent Application No. 201910073610.7, titled "IMAGE DEFORMATION CONTROL METHOD AND DEVICE AND HARDWARE DEVICE", filed on Jan. 25, 2019 with the Chinese Patent Office, both of which are incorporated herein by reference in their entireties.

FIELD

The present disclosure relates to the field of image processing, and in particular to a method and a device for controlling deformation on an image, and a hardware device.

BACKGROUND

With the development of computer technology, a range of application of smart terminals is extensively extended. For example, a smart terminal may be used to listen to music, play a game, chat online and take a picture. For a camera function of the smart terminal, camera pixels reach more than 10 million pixels, having a high definition and a photo effect comparable to that of a professional camera.

At present, in using a smart terminal to take a picture, a camera software built in the smart terminal at the factory may be used to achieve traditional photo effects, and an application (referred to as APP), for example, an APP with a dark light detection function, a beauty function and a super pixel function, may be downloaded from the network to achieve additional photo effects. Special effects of a smart terminal usually include processing effects such as skin color reproduction, skin retouching, eye enlarging, and face sliming, achieving a certain extent of special effect processing on all faces recognized in an image.

However, with the current special effect function, special effects are preset and then are synthesized into a video or image. If it is required to modify the special effects, other special effects are produced and then are synthesized into the video or image, resulting in inflexible special effects generation.

SUMMARY

The following technical solutions are provided according to an aspect of the present disclosure.

A method for controlling deformation on an image includes: acquiring a to-be-processed image; acquiring an audio file; playing the audio file and acquiring a first attribute value of the audio file corresponding to a current time point; determining an extent of the deformation on the image based on the first attribute value; and performing deformation processing on the to-be-processed image based on the extent of the deformation on the image.

Further, the acquiring a to-be-processed image includes: acquiring a video image and acquiring a video frame image included in the video image as the to-be-processed image.

Further, the acquiring an audio file includes: acquiring an audio file included in the video image.

Further, the playing the audio file and acquiring a first attribute value of the audio file corresponding to a current time point includes: playing the audio file; acquiring a currently played video frame image in the video image; calculating a current time point based on the video frame image; and acquiring the first attribute value of the audio file based on the current time point.

Further, the acquiring an audio file includes: acquiring the audio file and analyzing the audio file to acquire a correspondence table storing corresponding relationships between time points in the audio file and first attribute values of the audio file.

Further, the playing the audio file and acquiring a first attribute value of the audio file corresponding to a current time point includes: playing the audio file; acquiring a current playing time point of the audio file; and acquiring a first attribute value corresponding to the current playing time point according to the correspondence table.

Further, the determining an extent of the deformation of the image based on the first attribute value includes: acquiring a corresponding relationship between the first attribute value and the extent of the deformation on the image; and calculating the extent of the deformation on the image based on the first attribute value and the corresponding relationship.

Further, the performing deformation processing on the to-be-processed image based on the extent of the deformation on the image includes: acquiring a type of the deformation; and performing the deformation processing on the to-be-processed image based on the type of the deformation and the extent of the deformation.

Further, the acquiring a type of the deformation includes: acquiring a state serial number of a current image; and acquiring the type of the deformation based on the state serial number.

Further, the acquiring a state serial number of a current image includes: acquiring the extent of the deformation on the image; in a case that the extent of the deformation on the image is greater than a first threshold, setting a value of a deformation bit to be true and acquiring the state serial number of the current image; in a case that the extent of the deformation on the image is less than the first threshold and the value of the deformation bit is true, increasing the state serial number of the current image by one to acquire a first state serial number; and determining a remainder acquired by dividing the first state serial number by the total number of state serial numbers, as the state serial number of the current image.

The following technical solutions are further provided according to another aspect of the present disclosure.

A device for controlling deformation on an image includes an image acquisition module, an audio file acquisition module, a first attribute value acquisition module, a deformation extent acquisition module and a deformation processing module. The image acquisition module is configured to acquire a to-be-processed image. The audio file acquisition module is configured to acquire an audio file. The first attribute value acquisition module is configured to play the audio file and acquire a first attribute value of the audio file corresponding to a current time point. The deformation extent acquisition module is configured to determine an extent of the deformation on the image based on the first attribute value. The deformation processing module is configured to perform deformation processing on the to-be-processed image based on the extent of the deformation on the image.

Further, the image acquisition module includes a video image acquisition module. The video image acquisition module is configured to acquire a video image and acquire a video frame image in the video image as the to-be-processed image.

Further, the audio file acquisition module is further configured to acquire an audio file included in the video image.

Further, the first attribute value acquisition module includes a first audio playing module, a video frame image acquisition module, a first time point acquisition module, and an initial first attribute value acquisition module. The first audio playing module is configured to play the audio file. The video frame image acquisition module is configured to acquire a currently played video frame image in the video image. The first time point acquisition module is configured to calculate a current time point based on the video frame image. The initial first attribute value acquisition module is configured to acquire the first attribute value of the audio file based on the current time point.

Further, the audio file acquisition module includes an audio file analysis module. The audio file analysis module is configured to acquire the audio file and analyze the audio file to acquire a correspondence table storing corresponding relationships between time points in the audio file and first attribute values of the audio file.

Further, the first attribute value acquisition module includes a second time point acquisition module and a second first attribute value acquisition module. The second time point acquisition module is configured to acquire the current playing time point of the audio file. The second first attribute value acquisition module is configured to acquire the first attribute value corresponding to the current playing time point according to the correspondence table.

Further, the deformation extent acquisition module includes a corresponding relationship acquisition module and a deformation extent calculation module. The corresponding relationship acquisition module is configured to acquire a corresponding relationship between the first attribute value and the extent of the deformation on the image. The deformation extent calculation module is configured to calculate the extent of the deformation on the image based on the first attribute value and the corresponding relationship.

Further, the deformation processing module includes a deformation type acquisition module and a first deformation processing module. The deformation type acquisition module is configured to acquire a type of the deformation. The first deformation processing module is configured to perform the deformation processing on the to-be-processed image based on the type of the deformation and the extent of the deformation.

Further, the deformation type acquisition module includes a state serial number acquisition module and a deformation type acquisition sub-module. The state serial number acquisition module is configured to segment the to-be-processed image to acquire a contour of a to-be-processed target object. The deformation type acquisition sub-module is configured to acquire the type of the deformation based on the state serial number.

Further, the state serial number acquisition module includes a first extent acquisition module, a first current state serial number acquisition module, and a second current state serial number acquisition module. The first extent acquisition module is configured to acquire the extent of the deformation on the image. The first current state serial number acquisition module is configured to, in a case that the extent of the deformation on the image is greater than a first threshold, set a value of a deformation bit to be true and acquire the state serial number of the current image. The second current state serial number acquisition module is configured to: in a case that the extent of the deformation on the image is less than the first threshold and the value of the deformation bit is true, increase the state serial number of the current image by one to acquire a first state serial number; and determine a remainder acquired by dividing the first state serial number by the total number of state serial numbers as the state serial number of the current image.

The following technical solutions are further provided according to another aspect of the present disclosure.

An electronic device includes a memory and a processor. The memory is configured to store a non-transitory computer-readable instruction. The processor is configured to execute the computer-readable instruction to perform the method for controlling deformation on an image.

The following technical solutions are further provided according to another aspect of the present disclosure.

A computer-readable storage medium is configured to store a non-transitory computer-readable instruction. The non-transitory computer-readable instruction, when executed by a computer, causes the computer to perform the method for controlling deformation on an image.

A method and a device for controlling deformation on an image, and a hardware device are provided according to the present disclosure. The method for controlling deformation on an image includes: acquiring a to-be-processed image; acquiring an audio file; playing the audio file and acquiring a first attribute value of the audio file corresponding to a current time point; determining an extent of the deformation on the image based on the first attribute value; and performing deformation processing on the to-be-processed image based on the extent of the deformation on the image. With the method for controlling deformation on an image according to the embodiments of the present disclosure, the extent of the deformation on the image is controlled based on the attribute value of the audio file, thereby solving the technical problem in the conventional technology that the special effects of deformation cannot be flexibly generated.

The above description is only a summary of the technical solutions of the present disclosure. In order to understand the technical means of the present disclosure more clearly to implement the present disclosure in accordance with the content of the specification, and to make the above and other objectives, features and advantages of the present disclosure more apparent and understandable, preferred embodiments are described in detail below in conjunction with the drawings.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

Figure 1:
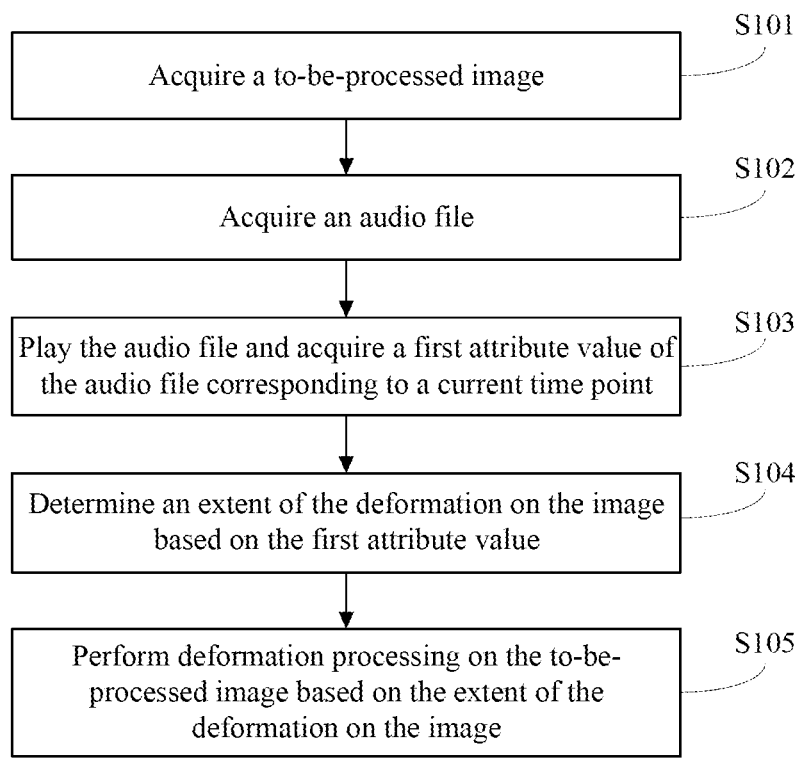
FIG. 1 is a schematic flowchart of a method for controlling deformation on an image according to a first embodiment of the present disclosure.

Embodiments of the present disclosure are described below with specific examples. Those skilled in the art can easily understand other advantages and effects of the present disclosure from content disclosed in this specification. It is apparent that the described embodiments are only some rather than all embodiments of the present disclosure. The present disclosure may be implemented or applied through other specific embodiments. Various details in this specification may be modified or changed based on different viewpoints and applications without departing from the spirit of the present disclosure. It should be noted that the following embodiments and the features in the following embodiments may be combined with each other without conflict. Based on the embodiments in the present disclosure, all other embodiments acquired by those skilled in the art without any creative work fall within the protection scope of the present disclosure.

It should be noted that various aspects of the embodiments within the scope of the appended claims are described below. It is apparent that aspects described herein may be widely embodied in various forms, and any specific structure and/or function described herein are only illustrative. Based on the present disclosure, those skilled in the art should understand that an aspect described herein may be implemented independently of any other aspects, and two or more of these aspects may be combined in various ways. For example, any number of aspects set forth herein may be used to implement the device and/or perform the method. In addition, other structures and/or functions other than one or more of the aspects set forth herein may be used to implement the device and/or perform the method.

It should further be noted that the drawings in the following embodiments only illustrate a basic idea of the present disclosure. Only components related to the present disclosure are shown in the drawings, which are not drawn according to the actual number, shape and size of the components in actual implementation. In actual implementation, a type, the number, and a proportion of each component may be changed optionally, and a component layout may be complicated.

In addition, in the following description, specific details are provided to facilitate thorough understanding of examples. However, those skilled in the art should understand that these aspects may be implemented without these specific details.

A method for controlling deformation on an image is provided according to a first embodiment of the present disclosure. The method for controlling deformation on an image according to this embodiment may be performed by a computing device. The computing device may be implemented as software, or as a combination of software and hardware. The computing device may be integrated in a server, a terminal apparatus or the like. As shown in FIG. 1, the method for controlling deformation on an image includes the following steps S101 to S105.

In step S101, a to-be-processed image is acquired.

In this embodiment, the to-be-processed image may be acquired by an image sensor. The image sensor may include various devices that can collect an image, such as a video camera, a webcam, and a camera. In this embodiment, the image sensor may be a camera on a terminal apparatus, such as a front or rear camera on a smart phone. An image collected by the camera may be directly displayed on a display screen of the smart phone. In this step, an image video collected by the image sensor is acquired for further processing of an image in a next step.

In an embodiment, the to-be-processed image may be acquired by acquiring a current image frame of a video collected by a terminal apparatus. A video includes multiple image frames, thus in this embodiment, a video image is acquired, and a video frame image included in the video image is acquired as the to-be-processed image. Optionally, a video image is acquired and a video frame image included in the video image is acquired as the to-be-processed image by: acquiring a video frame image corresponding to a current playing time point from the video image, and determining the video frame image corresponding to the current playing time point as the to-be-processed image. In this embodiment, different video frame images in the video image are acquired to be processed based on different current time points.

In step S102, an audio file is acquired.

In this step, the acquired audio file may be an audio file acquired from a local storage space or an audio file acquired from a network storage space. The audio file may include music, human voice, and the like.

In an embodiment, the audio file is acquired by: acquiring the audio file and analyzing the audio file to acquire a correspondence table storing corresponding relationships between time points in the audio file and first attribute values of the audio file. Optionally, the audio file and the to-be-processed image are independent of each other. The image may be a dynamic image such as a video or a gif, or a static image such as a picture. An audio file to be used is acquired, and the acquired audio file is preprocessed. The preprocessing may be to analyze the audio file at each time point. The time point may be set based on a sampling frequency. In this embodiment, an interval between adjacent time points may be set to 10 ms. That is, time points are sampled at intervals of 10 ms, and first attribute values of the audio file respectively at the time points are analyzed. The first attribute of the audio file may be any attribute, such as tone intensity, pitch, timbre, tone length and rhythm of the audio file. In this embodiment, the first attribute value of the audio file is an intensity of the rhythm. The intensity of the rhythm may be set to have five levels. For each of the time points, the level of the intensity of the rhythm at this time point is acquired by analyzing the audio file. After the audio file is analyzed, corresponding relationships between the time points and the levels of the intensity of the rhythm respectively corresponding to the time points are acquired. In this embodiment, the corresponding relationships may be stored in a correspondence table. The following table shows an example of the correspondence table:

| Time point | Level of intensity of rhythm |
| --- | --- |
| 10 ms | Second level |
| 20 ms | Fourth level |
| 30 ms | Fifth level |
| 40 ms | Third level |
| ... | ... |

In another embodiment, the audio file has a relationship with the to-be-processed image. The image may be a dynamic image such as a video or a gif, or a static image such as a picture. The relationship may be a corresponding relationship between the audio file and the to-be-processed image. For example, in a case that an audio file is played while a video is played or a picture is opened, the audio file is an audio file included in the video or an audio file built in the picture. In this embodiment, an audio file to be used is acquired, and the acquired audio file is preprocessed. The preprocessing may be to analyze the audio file at each time point. The time point may be set based on a sampling frequency. In this embodiment, the sampling frequency may be related to the attribute of the image. In a case that the image is a video and the video includes 30 video frames per second, an interval between adjacent time points may be set to 33 ms. That is, time points are sampled at intervals of 33 ms, thus a time point corresponds to a video frame. In a case that the image is a gif and the gif includes multiple image frames, a time instant at which an image frame is displayed is set as a time point. In a case that the image is a static image, the time point may be set arbitrarily. Apparently, in the case that the image is a video or a gif, the time point may be set arbitrarily, which is not repeated here. Attribute data of the audio file at the time point is analyzed. The attribute data of the audio file may be any attribute, such as tone intensity, pitch, timbre, tone length and rhythm of the audio file. In this embodiment, the attribute data of the audio file is an intensity of the rhythm. The intensity of the rhythm may be set to have five levels. For each of the time points, the level of the intensity of the rhythm at this time point is acquired by analyzing the audio file. After the audio file is analyzed, corresponding relationships between the time points and the levels of the intensity of the rhythm respectively corresponding to the time points is acquired. In this embodiment, the corresponding relationships may be stored in a correspondence table. The correspondence table in this embodiment is similar to the correspondence table in the previous embodiment, and is not repeated here. The correspondence table may store corresponding relationships between time points and attribute values of the audio file instead of the corresponding relationships between the time points and the levels of the attribute value of the audio file.

In an embodiment of the correspondence table, in the correspondence table, the time point includes a time point ID and attribute data of the audio file corresponding to the time point ID. The time point ID may be a serial number of the time point in a time point sequence.

It should be understood that although solutions for pre-analyzing the audio file are described in the above embodiments, these solutions do not limit the present disclosure. In fact, any solution for analyzing the audio file may be used in the present disclosure. In addition, in this step, the audio file may be acquired without analyzing the audio file. A solution for not pre-analyzing the audio file is described below, and is not described in detail here.

In step S103, the audio file is played, and a first attribute value of the audio file corresponding to a current time point is acquired.

In an embodiment, the audio file is played and the first attribute value of the audio file corresponding to the current time point is acquired by acquiring a current playing time point of the audio file; and acquiring the first attribute value corresponding to the current playing time point based on the correspondence table.

In an embodiment, the audio file and the to-be-processed image are independent of each other. A time instant at which the audio is currently played is acquired. In a case that the time instant at which the audio is currently played is not at a time point, the current time point may be determined by rounding up or down the time instant to which the audio is currently played. The correspondence table generated in step S102 is searched based on the current time point to acquire an attribute value of the audio file corresponding to the current time point. The attribute value of the audio file corresponding to the current time point is recorded as the first attribute value of the audio file. The correspondence table may be searched based on a serial number of the current time point for an attribute value of the audio file corresponding to a time point with the same serial number, and the attribute value of the audio file corresponding to the time point with the same serial number is recorded as the first attribute value of the audio file.

In another embodiment, the audio file is associated with the to-be-processed image. For example, the audio file is an audio file in the video. The audio file is played and a first attribute value of the audio file corresponding to a current time point is acquired by: playing the audio file; acquiring a currently played video frame image in the video image; calculating a current time point based on the video frame image; and acquiring the first attribute value of the audio file based on the current time point. Thus, with the sampling manner described in step S101, the time point of the audio file may be sampled with a frequency at which the video frame is played. The time point of the video frame corresponds to the time point of the audio. Therefore, a serial number of the video frame corresponds to a serial number of the time point of the audio, so that the current time point may be directly calculated based on the video frame. The correspondence table is searched based on a serial number of the current time point for an attribute value of the audio file corresponding to a time point with the same serial number, and the attribute value of the audio file corresponding to the time point with the same serial number is recorded as the first attribute value of the audio file.

In an embodiment, the audio file is not pre-analyzed in step S102. In this embodiment, the audio file is played and a first attribute value of the audio file corresponding to a current time point is acquired by: playing the audio file, and sampling the audio file at the current playing time point to obtain a sampled audio file; and analyzing the sampled audio file to obtain the first attribute value of the audio file. In this embodiment, the sampling frequency may be preset. The audio file, when being played, is sampled and analyzed in real time to obtain the attribute of the audio file. This attribute may be any attribute of the audio file described in step S102. In this embodiment, it is only required to preset the sampling frequency, the attribute of the audio file and the level of the attribute value of the audio file, without pre-generating a correspondence table storing corresponding relationships between the time points and the levels of the attribute value of the audio file or corresponding relationships between the time points and the attribute values of the audio file.

In step S104, an extent of the deformation on the image is determined based on the first attribute value.

In an embodiment, the extent of the deformation on the image is determined based on the first attribute value by: acquiring a corresponding relationship between the first attribute value and the extent of the deformation on the image; and calculating the extent of the deformation on the image based on the first attribute value and the corresponding relationship.

In an embodiment, a corresponding relationship between the first attribute value and the extent of the deformation on the image is acquired according to the above embodiment by: acquiring a correspondence table storing the corresponding relationship between the first attribute value and the extent of the deformation on the image. In this embodiment, the corresponding relationships between the first attribute values and the extents of the deformation on the image are preset, and the correspondence table storing the corresponding relationships between the first attribute values and the extents of deformation on the image is generated. In this embodiment, the first attribute value may be set to have 5 levels as in step S102, and each of the 5 levels corresponds to an extent of the deformation. In this embodiment, the extent of the deformation may be obtained by searching the correspondence table. Therefore, the extent of the deformation on the image is calculated based on the first attribute value and the corresponding relationship by: searching the correspondence table storing the corresponding relationships between the first attribute values and the extents of the deformation on the image for the first attribute value, and acquiring the extent of the deformation on the image corresponding to the first attribute value.

Optionally, in this embodiment, the corresponding relationships between the first attribute values and the extents of the deformation on the image may be acquired by: acquiring a function for calculating an extent of the deformation on the image based on a first attribute value. The function may be a linear function or a non-linear function. Variable extents of the deformation may be provided based on the function. In this embodiment, the first attribute value may have 5 levels as in step S102. Alternatively, the extent of the deformation on the image may be calculated directly based on an original value of the first attribute such as an intensity of music, which is not limited in the present disclosure.

In step S105, deformation processing is performed on the to-be-processed image based on the extent of the deformation on the image.

In an embodiment, the deformation processing is performed on the to-be-processed image based on the extent of the deformation on the image by setting a degree to which the deformation processing is performed on the image with the extent of the deformation on the image as a parameter for the deformation processing. The deformation processing with the degree is performed on the to-be-processed image, to obtain an image subjected to deformation.

In an embodiment, the performing deformation processing on the to-be-processed image based on the extent of the deformation on the image includes the following steps S10501 and S10502. In step S10501, a type of the deformation is acquired. In step S10502, the deformation processing is performed on the to-be-processed image based on the type of the deformation and the extent of the deformation. In an embodiment, the type of the deformation may be preset. In this embodiment, the deformation processing is performed on the to-be-processed image based on the preset type of the deformation and the extent of the deformation acquired in step S104. In another embodiment, a trigger condition of the type of the deformation may be preset. For example, eyes are enlarged if it is detected that the eyes of a human blinks twice, a mouth is shrunk if it is detected that a hand of a human waves, and so on. In this embodiment, corresponding relationships between the trigger conditions and the types of the deformation are preset and are stored in a configuration file. If a trigger condition is detected, a type of the deformation corresponding to the trigger condition is acquired. In this way, switching between different types of the deformation is performed.

In an embodiment, the to-be-processed image is an image of a human face, and the deformation is performed on the facial features of the human face. In this embodiment, the facial features on which the deformation is to be deformed may be preset. For the deformation on the facial features, it is required to segment the facial features from the to-be-processed image. In segmenting the facial features, face detection is performed first. In the face detection, an arbitrarily predetermined image or image sequence is searched based on a certain strategy to determine positions and regions where all faces are respectively located to determine whether human faces exist in the images or image sequence and determine the number of human faces and the spatial distribution of the human faces. Generally, face detection may be performed according to the following four manners. (1) A manner based on prior knowledge. In this manner, a rule library is formed based on typical faces to encode faces and faces are positioned based on a relationship between facial features. (2) A feature invariance manner. In this manner, stable features are determined in various postures, viewing angles or lighting conditions and then faces is determined based on these stable features. (3) A pattern matching manner. In this manner, multiple standard face patterns are stored to describe an entire face and facial features, and then a correlation between an inputted image and the stored patterns is calculated for detection. (4) A appearance-based manner. In this manner, different from the pattern matching manner, models are acquired by learning from a training image set and then are used for detection. The face detection may be described by an implementation of the fourth manner. First, a feature is extracted to establish a model. In this embodiment, a Haar feature is used as a key feature to recognize a face. The Haar feature is a simple rectangular feature which is extracted quickly. Generally, a feature template for calculating the Haar feature includes a simple combination of two or more congruent rectangles. The feature template includes a black rectangle and a white rectangle. Then, a few of key features are determined from a large number of Haar features by using an AdaBoost algorithm, and an effective classifier is constructed based on the key features. Faces in the image may be detected by using the constructed classifier.

After the face is detected, the facial features of the face are extracted based on predefined key points. For a typical human face, a contour of the face, eyes, eyebrows, a mouth, a nose, ears and the like may be marked with 108 key points. Images of different facial features may be extracted based on positions of key points respectively corresponding to these different facial features.

The above examples are only illustrative and do not limit the present disclosure. In practice, there are many methods for extracting an image. Any method with which the facial features can be extracted may be used in the present disclosure, and is not described in detail herein.

After the facial features are extracted, the type of the deformation and a target facial feature on which the deformation is performed may be acquired with the method in this step. Then, the deformation processing may be performed on the image based on the extent of the deformation and the target facial feature.

In this embodiment, the extent of the deformation is related to the audio file. Therefore, deformation processing may be automatically performed on the image based on the audio file without performing deformation on the image in advance.

In an embodiment, the to-be-processed image is a target object in an image, for example, the facial features in the above embodiment. Deformation processing is performed on the target object in a current video image frame based on the first attribute value. The current image frame may include multiple objects. The image frame may be processed by using the processing method in the above embodiment. In this embodiment, the to-be-processed image may be a video. While the video is playing, the shape of the target object may change with the video frames, and the processing for these video frames may change with the time points of the audio, achieving the effect that that the special effects on the target object in the video change with the audio.

Figure 2:
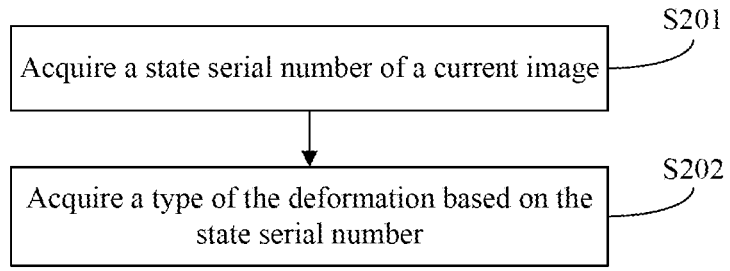
FIG. 2 is a schematic flowchart of an implementation of step S10501 in the present disclosure.

A method for controlling deformation on an image is provided according to a second embodiment of the present disclosure. The method for controlling deformation on an image according to the embodiment may be performed by a computing device. The computing device may be implemented as software, or as a combination of software and hardware. The computing device may be integrated in a server, a terminal apparatus and the like. As shown in FIG. 2, in the second embodiment, step S10501 in the first embodiment includes the following steps S201 to S202.

In step S201, a state serial number of a current image is acquired.

In step S202, the type of the deformation is acquired based on the state serial number.

In this embodiment, the image includes a state serial number, and each state serial number corresponds to a target object to be deformed and the type of the deformation. For example, a state sequence number 1 corresponds to twitching a left eyebrow, a state sequence number 2 corresponds to twitching a right eyebrow, a state sequence number 3 corresponds to twitching both left and right eyebrows, and a state sequence number 4 corresponds to twitching a left eyebrow and enlarging a left eye. Multiple states may be set, and each of the multiple states corresponds to a state serial number. After a serial number of a current state is acquired, the type of the deformation may be determined.

Figure 3:
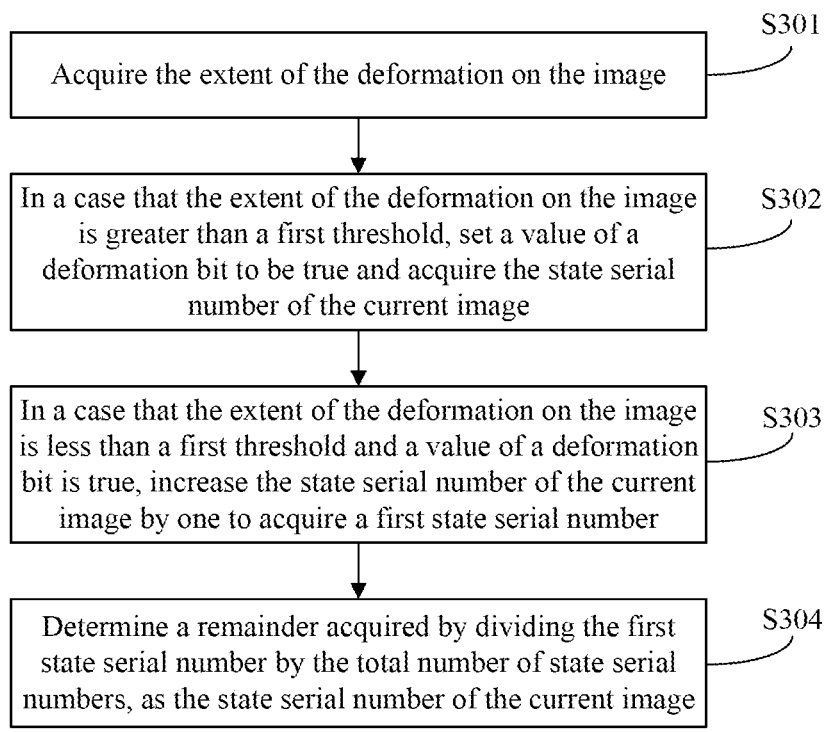
FIG. 3 is a schematic flowchart of an implementation of step S201 in the present disclosure.

In an embodiment, the deformation processing may be switched between multiple states of the image to achieve the effect of switching among multiple types of deformations. Specifically, as shown in FIG. 3, the state serial number of the current image is acquired in step S201 by performing the following steps S301 to S304.

In S301, the extent of the deformation on the image is acquired.

In S302, in a case that the extent of the deformation on the image is greater than a first threshold, a value of a deformation bit is set to be true and the state serial number of the current image is acquired.

In S303, in a case that the extent of the deformation on the image is less than the first threshold and the value of the deformation bit is true, the state serial number of the current image is increased by one to acquire a first state serial number.

In S304, a remainder, acquired by dividing the first state serial number by the total number of state serial numbers, is determined as the state serial number of the current image.

Figure 4:
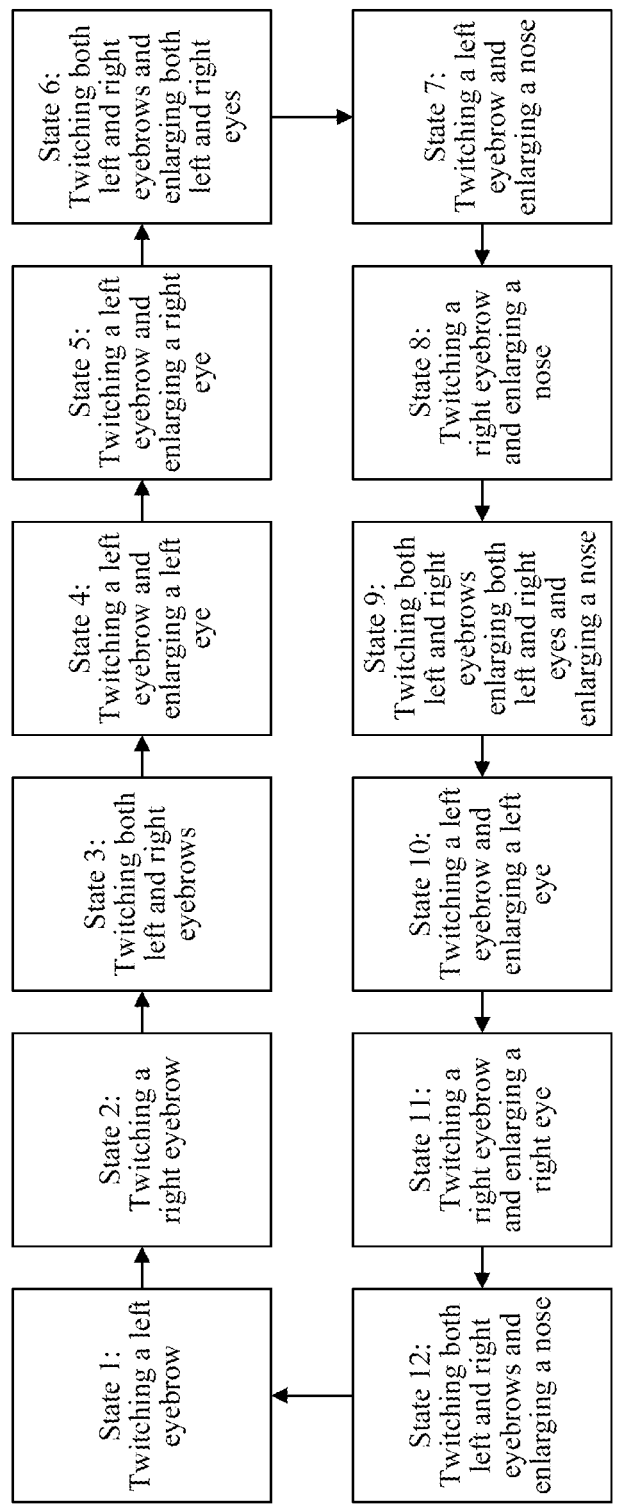
FIG. 4 is a schematic diagram showing an example of state switching in a method for controlling deformation on an image according to the present disclosure.

In this embodiment, state represents a current state serial number. The default value of the state serial number is set to 1, that is, a default state of an image is 1, and state is equal to 1. The extent of the deformation is acquired, and intensity represents the extent of the deformation. The type of the deformation is acquired based on the current state, and deformation processing is performed on a facial feature corresponding to the current state. At the beginning, state is equal to 1, and it is determined whether intensity is greater than a first threshold. In a case that intensity is greater than the first threshold, the value of the deformation bit is set to be true, flag represents the deformation bit, and the value of flag is set to be true. In a case that intensity is less than or equal to the first threshold and the value of flag is true, the value of state is calculated by using the expression of (state+1)% max_state_num, where max_state_num represents the number of states, and % indicates calculating a remainder. FIG. 4 shows an example of switching the state. In this example, there are twelve states in total. Starting from a state 1, in a case that the acquired extent of the deformation is greater than the first threshold, deformation processing is performed, and the value of flag is set to true. If the extent of the deformation remains greater than the first threshold, the deformation processing remains in state 1, that is, twitching a left eyebrow. In a case that the extent of the deformation is less than or equal to the first threshold and flag is equal to true, the current state is calculated by using the expression of (state+1)% max_state_num, where max_state_num is equal to 12, state increased by one equals to two, and the remainder is calculated to be 2. Then, the state is switched from state 1 to state 2, the state serial number is equal to 2, and deformation processing of twitching a right eyebrow is performed. The above operations are repeated until the state is switched to state 12. Thus, the state increased by one equals to 13, the remainder is calculated by using the expression of (state+1)% max_state_num to be 1, then the state is switched to state 1 and the cycle starts again.

In this embodiment, in a case that the intensity of the rhythm of the audio reaches a threshold, deformation processing is performed on the target object in the image. The target object and the type of the deformation are determined based on the state serial number. The state serial number changes with a certain rule to trigger the switching between multiple states to change the target object and the type of the deformation, achieving the effect of performing different deformation processing according to different music.

A method and a device for controlling deformation on an image, and a hardware device are provided according to the present disclosure. The method for controlling deformation on an image includes: acquiring a to-be-processed image; acquiring an audio file; playing the audio file and acquiring a first attribute value of the audio file corresponding to a current time point; determining an extent of the deformation on the image based on the first attribute value; and performing deformation processing on the to-be-processed image based on the extent of the deformation on the image. With the method for controlling deformation on an image according to the embodiments of the present disclosure, the extent of the deformation on the image is controlled based on the attribute value of the audio file, thereby solving the technical problem in the conventional technology that the special effects of deformation cannot be flexibly generated.

In the foregoing, although the steps in the above method embodiments are described in the above order, those skilled in the art should understand that the steps in the embodiments of the present disclosure are not necessarily performed in the above order, and may be performed in other orders such as a reverse order, a parallel order and a crossover order. Moreover, based on the above steps, those skilled in the art may add other steps. These obvious modifications or equivalent replacements should also be included in the protection scope of the present disclosure, and are not described in detail herein.

Device embodiments of the present disclosure are described below. The device according to the present disclosure may perform the method according to the present disclosure. For ease of description, only the parts related to the embodiments of the present disclosure are shown. For specific technical details that are not disclosed, reference may be made to the method embodiments of the present disclosure.

Figure 5:
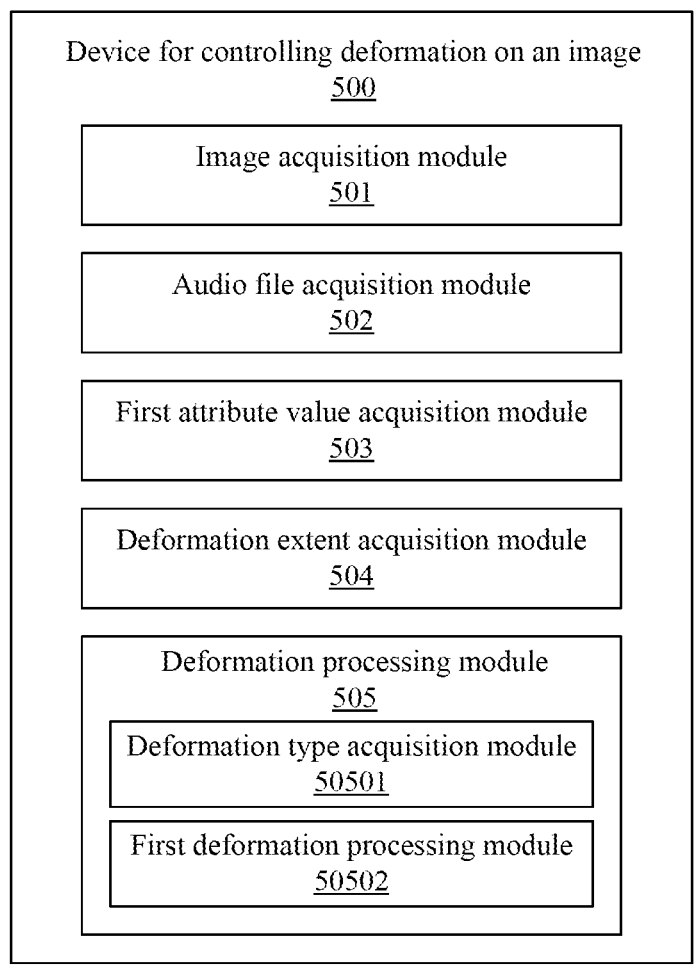
FIG. 5 is a schematic structural diagram of a device for controlling deformation on an image according to an embodiment of the present disclosure.

A device for controlling deformation on an image is provided according to an embodiment of the present disclosure. The device may perform the method for controlling deformation on an image in the first embodiment. As shown in FIG. 5, a device 500 includes an image acquisition module 501, an audio file acquisition module 502, a first attribute value acquisition module 503, a deformation extent acquisition module 504, and a deformation processing module 505.

The image acquisition module 501 is configured to acquire a to-be-processed image. The audio file acquisition module 502 is configured to acquire an audio file. The first attribute value acquisition module 503 is configured to play the audio file and acquire a first attribute value of the audio file corresponding to a current time point. The deformation extent acquisition module 504 is configured to determine an extent of the deformation on the image based on the first attribute value. The deformation processing module 505 is configured to perform deformation processing on the to-be-processed image based on the extent of the deformation on the image.

Further, the image acquisition module 501 includes a video image acquisition module. The video image acquisition module is configured to acquire a video image, and acquire a video frame image in the video image as the to-be-processed image.

Further, the audio file acquisition module 502 is further configured to acquire an audio file included in the video image.

Further, the first attribute value acquisition module 503 includes a first audio playing module, a video frame image acquisition module, a first time point acquisition module, and an initial first attribute value acquisition module. The first audio playing module is configured to play the audio file. The video frame image acquisition module is configured to acquire a currently played video frame image in the video image. The first time point acquisition module is configured to calculate a current time point based on the video frame image. The initial first attribute value acquisition module is configured to acquire the first attribute value of the audio file based on the current time point.

Further, the audio file acquisition module 502 includes an audio file analysis module. The audio file analysis module is configured to acquire the audio file and analyze the audio file to acquire a correspondence table storing corresponding relationships between time points in the audio file and first attribute values of the audio file.

Further, the first attribute value acquisition module 503 includes a second time point acquisition module and a second first attribute value acquisition module. The second time point acquisition module is configured to acquire the current playing time point of the audio file. The second first attribute value acquisition module is configured to acquire the first attribute value corresponding to the current playing time point according to the correspondence table.

Further, the deformation extent acquisition module 504 includes a corresponding relationship acquisition module and a deformation extent calculation module. The corresponding relationship acquisition module is configured to acquire a corresponding relationship between the first attribute value and the extent of the deformation on the image. The deformation extent calculation module is configured to calculate the extent of the deformation on the image based on the first attribute value and the corresponding relationship.

Further, the deformation processing module 505 includes a deformation type acquisition module 50501 and a first deformation processing module 50502. The deformation type acquisition module 50501 is configured to acquire a type of the deformation. The first deformation processing module 50502 is configured to perform the deformation processing on the to-be-processed image based on the type of the deformation and the extent of the deformation.

The device shown in FIG. 5 may perform the method in the embodiment shown in FIG. 1. For parts that are not described in detail in this embodiment, reference may be made to the related description of the embodiment shown in FIG. 1. For the implementation and technical effects of this technical solution, reference may be made to the description of the embodiment shown in FIG. 1, which is not repeated here.

Figure 6:
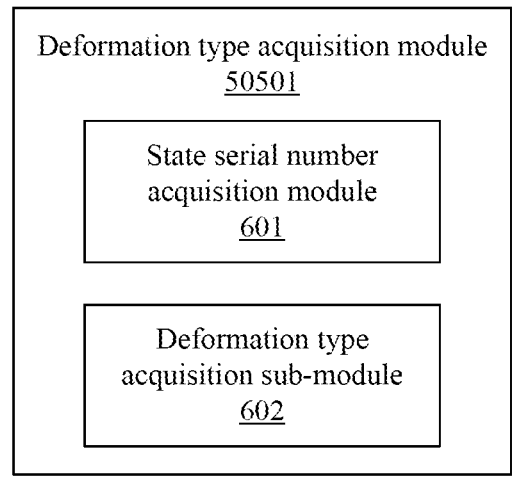
FIG. 6 is a schematic structural diagram of a deformation type acquisition module 50501 according to an embodiment of the present disclosure.

A device for controlling deformation on an image is provided according to another embodiment of the present disclosure. The device may perform the method for controlling deformation on an image according to the second embodiment. The device includes the deformation type acquisition module 50501 included in the device for controlling deformation on an image according to the first embodiment. As shown in FIG. 6, the deformation type acquisition module 50501 includes a state serial number acquisition module 601 and a deformation type acquisition sub-module 602. The state serial number acquisition module 601 is configured to segment the to-be-processed image to acquire a contour of a to-be-processed target object. The deformation type acquisition sub-module 602 is configured to acquire the type of the deformation based on the state serial number.

Further, the state serial number acquisition module 601 includes a first extent acquisition module, a first current state serial number acquisition module, and a second current state serial number acquisition module. The first extent acquisition module is configured to acquire the extent of the deformation on the image. The first current state serial number acquisition module is configured to, in a case that the extent of the deformation on the image is greater than a first threshold, set a value of a deformation bit to be true and acquire the state serial number of the current image. The second current state serial number acquisition module is configured to: in a case that the extent of the deformation on the image is less than the first threshold and the value of the deformation bit is true, increase the state serial number of the current image by one to acquire a first state serial number; and determine a remainder acquired by dividing the first state serial number by the total number of state serial numbers as the state serial number of the current image.

The device shown in FIG. 6 may perform the method in the embodiment shown in FIG. 2. For parts that are not described in detail in this embodiment, reference may be made to the related description of the embodiment shown in FIG. 2. For the implementation and technical effects of this technical solution, reference may be made to the description of the embodiment shown in FIG. 2, which is not repeated here.

Hereinafter, reference is made to FIG. 7, which shows a schematic structural diagram of an electronic device 700 for implementing the embodiments of the present disclosure. The electronic device in the embodiments of the present disclosure may include but is not limited to a mobile terminal such as a mobile phone, a notebook computer, a digital broadcast receiver, a PDA (personal digital assistant), a PAD (tablet), a PMP (portable multimedia player), and a vehicle-mounted terminal (for example, a vehicle-mounted navigation terminal), and a fixed terminal such as a digital TV and a desktop computer. The electronic device shown in FIG. 7 is only an example, and should not limit the function and scope of use of the embodiments of the present disclosure.

Figure 7:
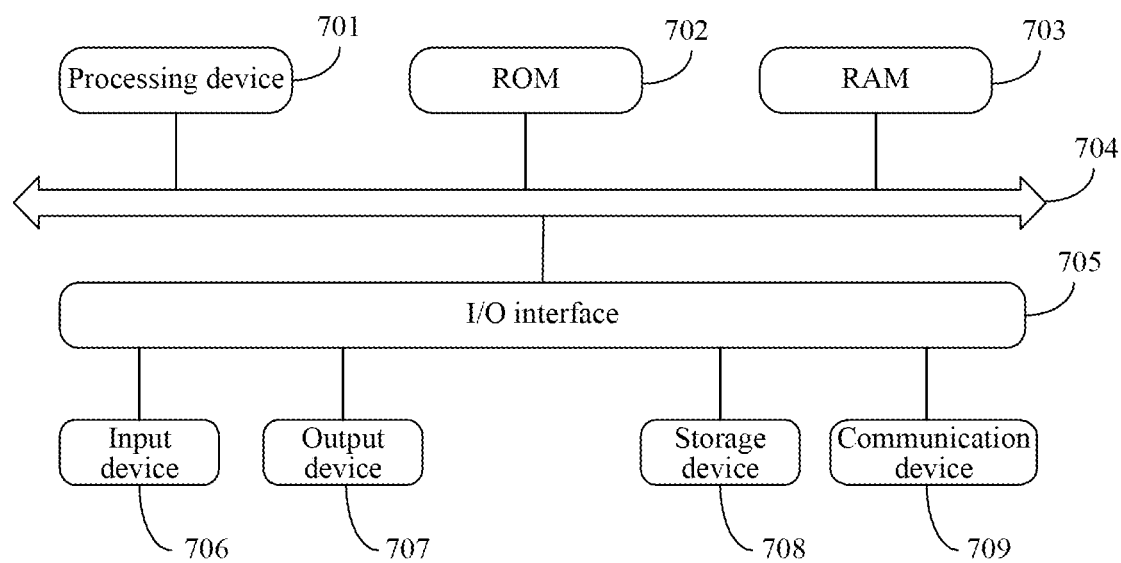
FIG. 7 is a schematic structural diagram of an electronic device according to an embodiment of the present disclosure.

As shown in FIG. 7, the electronic device 700 may include a processing device 701 (such as a central processing unit and a graphics processing unit). The processing device 701 may perform various appropriate operations and processing based on a program stored in a read only memory (ROM) 702 or a program loaded in a random access memory (RAM) 703 from a storage device 708. Various programs and data required by the electronic device 700 are also stored in the RAM 703. The processing device 701, the ROM 702, and the RAM 703 are connected to each other via a bus 704. An input/output (I/O) interface 705 is connected to the bus 704.

Generally, the following devices may be connected to the I/O interface 705: an input device 706 such as a touch screen, a touch pad, a keyboard, a mouse, an image sensor, a microphone, an accelerometer and a gyroscope; an output device 707 such as a liquid crystal display (LCD), a speaker and a vibrator; a storage device 708 such as a magnetic tape and a hard disk; and a communication device 709. With the communication device 709, the electronic device 700 may perform wireless or wired communication with another device to exchange data. Although FIG. 7 shows an electronic device 700 including various devices, it should be understood that the electronic device 700 is not required to be implemented or to include all the illustrated devices. These devices may be implemented alternatively or the terminal device 700 may include more or fewer devices.

In particular, the processes, described above with reference to flow charts, may be implemented as a computer software program according to an embodiment of the present disclosure. For example, a computer program product is provided according to an embodiment of the present disclosure. The computer program product includes a computer program embodied on a computer-readable medium, and the computer program includes program codes for executing a method shown in a flowchart. In this embodiment, the computer program may be downloaded from a network via the communication device 709, and be installed, or the computer program may be read from the storage device 708, and be installed, or the computer program may be read from the ROM 702, and be installed. The computer program, when executed by the processing device 701, implements functions defined in the method according to the embodiment of the present disclosure.

It should be noted that the above computer-readable medium in the present disclosure may be a computer-readable signal medium or a computer-readable storage medium or any combination of a computer-readable signal medium or a computer-readable storage medium. The computer-readable storage medium, for example, may be but is not limited to, an electrical, magnetic, optical, electromagnetic, infrared, or semiconductor system, apparatus, or device, or any combination thereof. More particularly, the computer-readable storage medium may include but is not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any proper combination of the above. In the present disclosure, the computer-readable storage medium may be any tangible medium that includes or stores a program. The program may be used by an instruction execution system, apparatus or device or used in combination therewith. In the present disclosure, the computer-readable signal medium may include a data signal transmitted in a baseband or as a part of a carrier wave, and carries a computer-readable program code. This transmitted data signal may be in many forms, including but not limited to an electromagnetic signal, an optical signal, or any proper combination of an electromagnetic signal and an optical signal. The computer-readable signal medium may also be any computer-readable medium other than the computer-readable storage medium. The computer-readable signal medium may transmit, propagate, or transport a program utilized by an instruction execution system, apparatus or device or used in combination therewith. The program code embodied in the computer-readable medium may be transmitted by any proper medium, including but not limited to a wire, an optical cable, RF (radio frequency) or any suitable combination of the foregoing.

The above computer-readable medium may be included in the above electronic device, or may be separate and not in the electronic device.

The above computer-readable medium stores one or more programs. The electronic device, when executing the one or more programs, performs the following operations: acquiring a to-be-processed image; acquiring an audio file; playing the audio file and acquiring a first attribute value of the audio file corresponding to a current time point; determining an extent of the deformation on the image based on the first attribute value; and performing deformation processing on the to-be-processed image based on the extent of the deformation on the image.

Computer program code for performing operations of the present disclosure may be written in one or more programming languages or a combination thereof. The above programming languages include object-oriented programming languages such as Java, Smalltalk. and C++, also include conventional procedural programming languages such as "C" language or similar programming languages. The program code may be entirely executed on a user's computer, or be partly executed on the user's computer, or be executed as an independent software package, or be partly executed on the user's computer and partly on a remote computer, or be entirely executed on the remote computer or server. In the case that the execution of the program code involves a remote computer, the remote computer may be connected to the user's computer via any kind of network, including a local area network (LAN) or a wide area network (WAN). Alternatively, the remote computer may be connected to an external computer (for example, via an Internet provided by an Internet service provider).

The flowcharts and block diagrams in the drawings illustrate frameworks, functions, and operations of possible implementations of the products of system, method and computer program provided according to the embodiments of the present disclosure. Each block in the flowcharts or block diagrams may represent a module, a program segment, or a part of code. The module, program segment, or part of the code includes one or more executable instructions for implementing a specified logic function. It should be noted that, in some alternative implementations, the functions shown in the blocks may be implemented in an order different from the order shown in the drawings. For example, two blocks shown in succession may in fact be executed substantially in parallel, and they may sometimes be executed in a reverse order, depending upon the functionality involved. It should further be noted that each block in the block diagrams and/or flowcharts and a combination of blocks in the block diagrams and/or flowcharts may be implemented by a dedicated hardware-based system which is configured to implement specified functions or operations, or can be implemented by using a combination of dedicated hardware and computer instructions.

Units involved in the embodiments of the present disclosure may be implemented by software or by hardware. The name of the unit does not in any way constitute a limitation on the unit itself.

The above are only preferred embodiments of the present disclosure and are illustrative of the technical principles applied in the present disclosure. Those skilled in the art should understand that the scope of the present disclosure is not limited to the technical solutions formed by a specific combination of the above technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

The invention claimed is:

1. A method for controlling deformation on an image, comprising:
　acquiring a to-be-processed image;
　acquiring an audio file;
　playing the audio file and acquiring a first attribute value of the audio file corresponding to a current time point;
　determining an extent of the deformation on the image based on the first attribute value;
　performing deformation processing on the to-be-processed image based on the extent of the deformation on the image, wherein the performing deformation processing on the to-be-processed image based on the extent of the deformation on the image further comprises:
　　acquiring a type of the deformation, and
　　performing the deformation processing on the to-be-processed image based on the type of the deformation and the extent of the deformation, wherein the type of the deformation is acquired based on acquiring a state serial number of a current image;
　wherein the acquiring a state serial number of a current image further comprises:
　acquiring the extent of the deformation on the image;
　in response to determining that the extent of the deformation on the image is greater than a first threshold, setting a value of a deformation bit to be true and acquiring the state serial number of the current image;
　in response to determining that the extent of the deformation on the image is less than the first threshold and the value of the deformation bit is true, increasing the state serial number of the current image by one to acquire a first state serial number; and
　determining a remainder acquired by dividing the first state serial number by a total number of state serial numbers, as the state serial number of the current image.

2. The method for controlling deformation on an image according to claim 1, wherein the acquiring a to-be-processed image comprises:
　acquiring a video image and acquiring a video frame image comprised in the video image as the to-be-processed image.

3. The method for controlling deformation on an image according to claim 2, wherein the acquiring an audio file comprises:
　acquiring an audio file comprised in the video image.

4. The method for controlling deformation on an image according to claim 3, wherein the playing the audio file and acquiring a first attribute value of the audio file corresponding to a current time point comprises:
　playing the audio file;
　acquiring a currently played video frame image in the video image;
　calculating a current time point based on the video frame image; and
　acquiring the first attribute value of the audio file based on the current time point.

5. The method for controlling deformation on an image according to claim 1, wherein the acquiring an audio file comprises:
　acquiring the audio file and analyzing the audio file to acquire a correspondence table storing corresponding relationships between time points in the audio file and first attribute values of the audio file.

6. The method for controlling deformation on an image according to claim 5, wherein the playing the audio file and acquiring a first attribute value of the audio file corresponding to a current time point comprises:
　playing the audio file;
　acquiring a current playing time point of the audio file; and
　acquiring a first attribute value corresponding to the current playing time point according to the correspondence table.

7. The method for controlling deformation on an image according to claim 1, wherein the determining an extent of the deformation on the image based on the first attribute value comprises:
　acquiring a corresponding relationship between the first attribute value and the extent of the deformation on the image; and
　calculating the extent of the deformation on the image based on the first attribute value and the corresponding relationship.

8. The method for controlling deformation on an image according to claim 1, wherein the acquiring a type of the deformation comprises:
　acquiring the type of the deformation based on the state serial number.

9. A device for controlling deformation on an image, comprising:
　at least one processor; and
　at least one memory communicatively coupled to the at least one processor and storing instructions that upon execution by the at least one processor cause the device to perform:
　acquiring a to-be-processed image;

acquiring an audio file;

playing the audio file and acquiring a first attribute value of the audio file corresponding to a current time point;

determining an extent of the deformation on the image based on the first attribute value;

performing deformation processing on the to-be-processed image based on the extent of the deformation on the image, wherein the performing deformation processing on the to-be-processed image based on the extent of the deformation on the image further comprises:

acquiring a type of the deformation, and performing the deformation processing on the to-be-processed image based on the type of the deformation and the extent of the deformation, wherein the type of the deformation is acquired based on acquiring a state serial number of a current image;

wherein the acquiring a state serial number of a current image further comprises:

acquiring the extent of the deformation on the image;

in response to determining that the extent of the deformation on the image is greater than a first threshold, setting a value of a deformation bit to be true and acquiring the state serial number of the current image;

in response to determining that the extent of the deformation on the image is less than the first threshold and the value of the deformation bit is true, increasing the state serial number of the current image by one to acquire a first state serial number; and determining a remainder acquired by dividing the first state serial number by a total number of state serial numbers, as the state serial number of the current image.

10. The device according to claim 9, wherein the acquiring an audio file comprises:

acquiring the audio file and analyzing the audio file to acquire a correspondence table storing corresponding relationships between time points in the audio file and first attribute values of the audio file.

11. The device according to claim 10, wherein the playing the audio file and acquiring a first attribute value of the audio file corresponding to a current time point comprises:

playing the audio file;

acquiring a current playing time point of the audio file; and acquiring a first attribute value corresponding to the current playing time point according to the correspondence table.

12. The device according to claim 9, wherein the determining an extent of the deformation on the image based on the first attribute value comprises:

acquiring a corresponding relationship between the first attribute value and the extent of the deformation on the image; and calculating the extent of the deformation on the image based on the first attribute value and the corresponding relationship.

13. An electronic device, comprising:

a memory configured to store a non-transitory computer-readable instruction; and a processor configured to execute the computer-readable instruction to perform the method for controlling deformation on an image according to claim 1.

14. A non-transitory computer-readable storage medium configured to store a non-transitory computer-readable instruction, wherein the non-transitory computer-readable instruction, when executed by a computer, causes the computer to perform operations comprising:

acquiring a to-be-processed image;

acquiring an audio file;

playing the audio file and acquiring a first attribute value of the audio file corresponding to a current time point;

determining an extent of the deformation on the image based on the first attribute value;

performing deformation processing on the to-be-processed image based on the extent of the deformation on the image, wherein the performing deformation processing on the to-be-processed image based on the extent of the deformation on the image further comprises:

acquiring a type of the deformation, and performing the deformation processing on the to-be-processed image based on the type of the deformation and the extent of the deformation, wherein the type of the deformation is acquired based on acquiring a state serial number of a current image;

wherein the acquiring a state serial number of a current image further comprises:

acquiring the extent of the deformation on the image;

in response to determining that the extent of the deformation on the image is greater than a first threshold, setting a value of a deformation bit to be true and acquiring the state serial number of the current image;

in response to determining that the extent of the deformation on the image is less than the first threshold and the value of the deformation bit is true, increasing the state serial number of the current image by one to acquire a first state serial number; and determining a remainder acquired by dividing the first state serial number by a total number of state serial numbers, as the state serial number of the current image.

15. The device according to claim 9, wherein the acquiring a to-be-processed image comprises:

acquiring a video image and acquiring a video frame image comprised in the video image as the to-be-processed image.

16. The device according to claim 15, wherein the acquiring an audio file comprises:

acquiring an audio file comprised in the video image.

17. The device according to claim 16, wherein the playing the audio file and acquiring a first attribute value of the audio file corresponding to a current time point comprises:

playing the audio file;

acquiring a currently played video frame image in the video image;

calculating a current time point based on the video frame image; and acquiring the first attribute value of the audio file based on the current time point.

* * * * *